United States Patent Office.

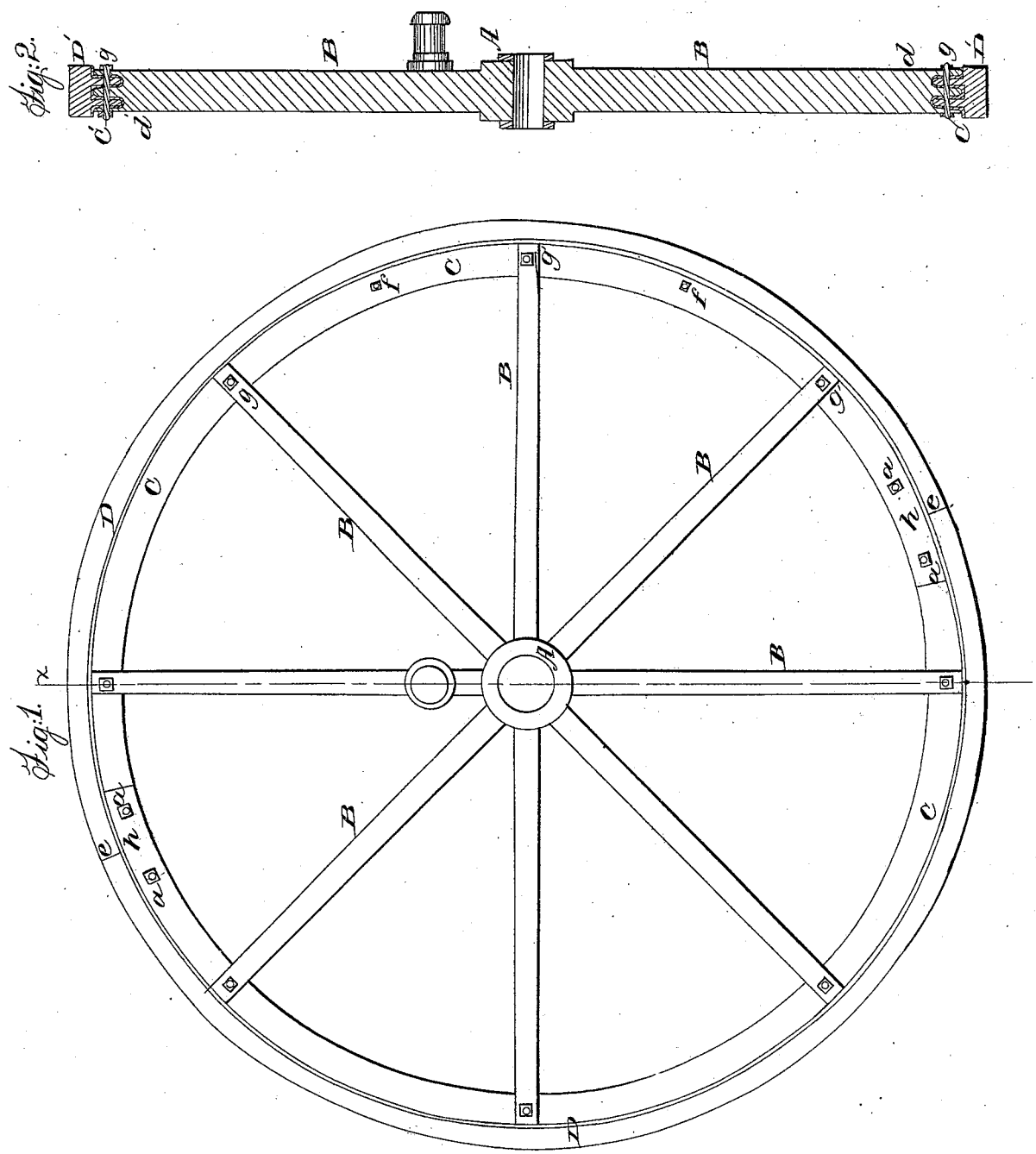

MARY JANE MONTGOMERY, OF NEW YORK, N. Y.

IMPROVEMENT IN LOCOMOTIVE-WHEELS.

Specification forming part of Letters Patent No. 42,958, dated May 31, 1864.

*To all whom it may concern:*

Be it known that I, MARY JANE MONTGOMERY, of the city and county of New York, in the State of New York, have invented a new and improved wheel to be used as the driving-wheel of locomotive-engines, and may be used for carriages, wagons, and other vehicles; and I do hereby declare the following to be a full and exact description thereof, reference being had to the accompanying drawings and the lettering thereon, forming a part of this specification, in which said drawings—

Figure I is a view reduced of said wheel, and Fig. II a vertical section thereof through the line *x x* of Fig. I.

The nature of my invention consists in substituting a curved corrugated beam to the periphery of the wheel instead of the usual fellies of wood or other material, or the equivalent of such fellies, as in the iron wheels of locomotives, and in applying thereto a tire of iron or steel with ribs or tongues fitting into the grooves formed by the curved corrugated beam.

To enable others skilled in the art to make and use my invention, I give the following as the description of its construction:

In both figures the same letters represent the same parts.

I do not claim any improvement on the hub and arms or spokes of the wheel. I have therefore represented these parts in the most simple form, A being the hub, and B B B the arms or spokes.

Instead of the wooden fellies used in ordinary wheels, and the cast or wrought iron rim of driving and other wheels of locomotives, I use a corrugated beam of wrought-iron or other metal, to which I give the proper curve to suit the diameter of the wheel, and this curved beam may be of one entire piece, and secured at the junction of the ends by bolts or otherwise. In some cases this curved beam may be in two or more pieces. This part is represented in Fig. I in elevation or front view by letter C, and in Fig. II in section by letter C', and *a a a a* show the head of the bolts by which the ends are secured to each other when made of two semicircular beams.

D D in Fig. I is a plan or front view of the tire or outer rim, and D' D' in Fig. II a section of the same. From the inner face of the tire proceed one, two, or more ribs, the number depending upon the number of corrugations in the beam C, and fit into the outer cavities of the beam, as seen at *d d*. I make the whole of this tire of wrought-iron, or the tire proper, D', or its face of steel, and the ribs or tongues *d d* of wrought-iron, or the whole of steel. From the nature of the construction of this part it is evident it cannot be shrunk on, as is done in ordinary wheels or the driving-wheel of locomotives. I therefore make it up of two or more pieces of such lengths that the ends or butts will be in exact apposition when the whole tire is in its proper position. Two joints thus formed are shown at *e e*, Fig. I, and when, as in the figure, only two segments are used in forming the tire, I prefer making these joints correspond as nearly as possible with those in the beams, because the same bolts will then suffice for securing both these parts. Of course, when it is important to have the contiguous faces of the corrugated beam and tire to fit accurately it will be necessary to turn or grind them down. This may not be generally the case, at least in ordinary vehicles, and in these as well as other cases the joint between the two may be closed up with great accuracy by battering up the outer edges of the beam against the inner face of the tire, or by what is known among engineers as "calking."

To give a certain elasticity to the wheel, where this may be desirable, I introduce a sheet of india-rubber, (caoutchouc,) vulcanized or not, between the corrugated beam and tire, or a strip of the same material may be placed in the bottom of the corrugated grooves for the tongue of the tire to rest upon. In either case it may be necessary to make the bolt-hole through the tongue a little larger than the bolt, to allow for the action of the rubber.

The manner of attaching the periphery of the wheel—that is, the corrugated curved beam C and tire D, to the arms or spokes—is shown at *g g* in Fig. II, where a bolt will be seen passing through the forked ends of the spoke, the corrugated beam and the tongues of the tire, and riveted or otherwise fastened on the outside, as seen at *g' g'*, Fig. I. Where broader spokes are used, more than one bolt may also be used, and if deemed necessary additional bolts may be introduced between the ends of the spokes, simply to make the connection between the corrugated beam and tire more firm. As these bolts, passing through the tongue, do not materially weaken the tire, it may be well to use a liberal number of them, so that if any part of the tire should be cracked the ends may be still held in juxtaposition. The heads of two of such intermediate bolts are shown at $f f$, Fig. I, while at $h\ h$ of the same figure are others, which at the same time that they serve this purpose also secure the overlap of the ends of the corrugated beams.

Having thus fully set forth the construction and use of my invention, what I claim therein, and desire to secure by Letters Patent of the United States, is—

1. The application of a corrugated beam of metal, constructed substantially as described, to wheels of locomotive-engines, cars, vehicles, and carriages of all kinds.

2. The combination of the aforesaid corrugated metal beam C with the metallic tire D in the construction of wheels of locomotive-engines, cars, vehicles, and carriages of all kinds, substantially as described.

M. JANE MONTGOMERY.

Witnesses:
GILBERT B. TOWLES,
H. KING.